United States Patent
Tanaka

(10) Patent No.: US 6,977,378 B2
(45) Date of Patent: Dec. 20, 2005

(54) FOURIER TRANSFORM INFRARED SPECTROMETER WITH DRIER

(75) Inventor: Toyohiko Tanaka, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 385 days.

(21) Appl. No.: 10/618,756

(22) Filed: Jul. 15, 2003

(65) Prior Publication Data
US 2004/0056198 A1 Mar. 25, 2004

(30) Foreign Application Priority Data
Sep. 19, 2002 (JP) ............... 2002-272724

(51) Int. Cl.⁷ ............................................. G01J 3/45
(52) U.S. Cl. ............................................. 250/339.08
(58) Field of Search ................................... 250/339.08

(56) References Cited

U.S. PATENT DOCUMENTS
5,703,689 A * 12/1997 Powell ........................ 356/432

FOREIGN PATENT DOCUMENTS
JP 10-253454 * 9/1998 ............. G01J 3/45

OTHER PUBLICATIONS
"FTIR Dedicated 2-13 Micrometer Photoconductor Thermoelectrically Cooled Optically Immersed"—Systems S.A.; Aug. 16, 2005.*

* cited by examiner

Primary Examiner—Otilia Gabor
(74) Attorney, Agent, or Firm—Manabu Kanesaka

(57) ABSTRACT

A Fourier transforming infrared spectrometer includes an optical element made of a material with deliquescence property, a chamber for housing the optical element, and a drying unit disposed in the chamber for discharging moisture condensed at a cooling portion of the drying unit provided in the chamber to the outside. The drying unit may be a Peltier element.

6 Claims, 1 Drawing Sheet

FOURIER TRANSFORM INFRARED SPECTROMETER WITH DRIER

BACKGROUND OF THE INVENTION AND RELATED ART STATEMENT

The invention relates to a Fourier transform infrared spectrophotometer (hereinafter referred to as "FTIR") provided with an optical element made of a material with deliquescence property, more specifically, relates to a method for removing moisture in a chamber storing the optical element.

An optical material with deliquescence property (a property of absorbing and dissolving moisture in air) such as KBr has been used for an optical element such as a beam splitter or the like in an interferometer of FTIR. Therefore, in order to prevent the deliquescence of the optical material, the interferometer including such an optical element as described above is stored in a sealed chamber with a drying agent such as a silica gel for removing moisture therein.

Incidentally, in general, as the moisture is absorbed, an ability of the drying agent to absorb the moisture is lowered. Therefore, it is necessary to exchange the drying agent periodically to maintain the ability of absorbing moisture at a desired level.

In the FTIR described above, air enters the sealed chamber when the drying agent is exchanged. Accordingly, it is difficult to exchange the drying agent in a high humid environment. For this reason, when the drying agent is exchanged, it is necessary to move the FTIR to a place with a low humidity.

It is troublesome to exchange the drying agent periodically. However, if the drying agent is not exchanged for a long time while the FTIR is used frequently, it is possible to damage the optical element due to the deliquesce.

In order to reduce a frequent exchange of the drying agent in the FTIR using an optical material with deliquescence property, Japanese Patent Publication (KOKAI) No. 10-253454 has disclosed an FTIR having a sealed chamber in which an interferometer using an optical material with deliquescence property and a heater for an infrared light source are arranged. A box member including a drying agent is disposed adjacent to the heater for the infrared light source. The box member further includes a first opening for communicating with an atmospheric air side, a second opening communicating with the sealed chamber side, and a valve for opening one of the two openings. In the FTIR, the heater for the infrared light source dries and regenerates the drying agent while the FTIR is in use. The valve of the box member opens the first opening to the atmospheric air side when the FTIR is in use, and the second opening to the sealed chamber side is opened while the FTIR is not in use.

The present invention has been made to solve the problems mentioned above with a method different from that disclosed in Japanese Patent Publication No. 10-253454, and an object of the invention is to provide an FTIR wherein it is not necessary to exchange the drying agent at all, or frequently.

Further objects and advantages of the invention will be apparent from the following description of the invention.

SUMMARY OF THE INVENTION

To attain the objects described above, according to the present invention, an FTIR includes an optical element made of a material with deliquescence property, a chamber for housing the optical element, and a drying unit disposed in the chamber for discharging moisture condensed at a cooling portion thereof provided in the chamber to the outside. The drying unit may include a Peltier element for the cooling portion.

In a case that the drying unit includes the Peltier element for the cooling portion, the drying unit is attached to the chamber housing the optical element such that a cooling side of the Peltier element faces an inside of the chamber housing the optical element, and a heating side thereof faces an outside of the chamber. The cooling portion disposed in the chamber contacts the cooling side of the Peltier element.

When the Peltier element is powered on, the moisture is condensed on the cooling portion contacting the Peltier element in the chamber. The condensed moisture is transferred to the heating side of the Peltier element disposed outside the chamber through, for example, a separately provided absorbent, and is discharged outside as water vapor. Therefore, the moisture in the chamber is reduced to maintain the chamber in a low moisture state.

In a case that the drying unit has a power supply line separated from that for operating the apparatus at inside or outside of the apparatus, it is possible to continuously operate the drying unit even when the apparatus is not in use. It is also possible to confirm an operating state of the drying unit when a display lamp is provided in the power supply line of the drying unit.

A drying agent may be provided in the chamber housing the optical element in addition to the drying unit, as in the conventional FTIR. In this case, since the drying unit is provided, the drying agent does not need to absorb a large quantity of the moisture, thereby reducing a frequency of exchanging the drying agent. It is also possible to maintain the chamber housing the optical element in a low humidity state even when the drying unit is stopped due to electric power failure or the like.

As described above, according to the present invention, it is possible to eliminate the exchange of the drying agent or reduce the frequency of exchanging the drying agent.

DETAILED DESCRIPTION OF PREFERRED EMBODIMENTS

Figure 1:
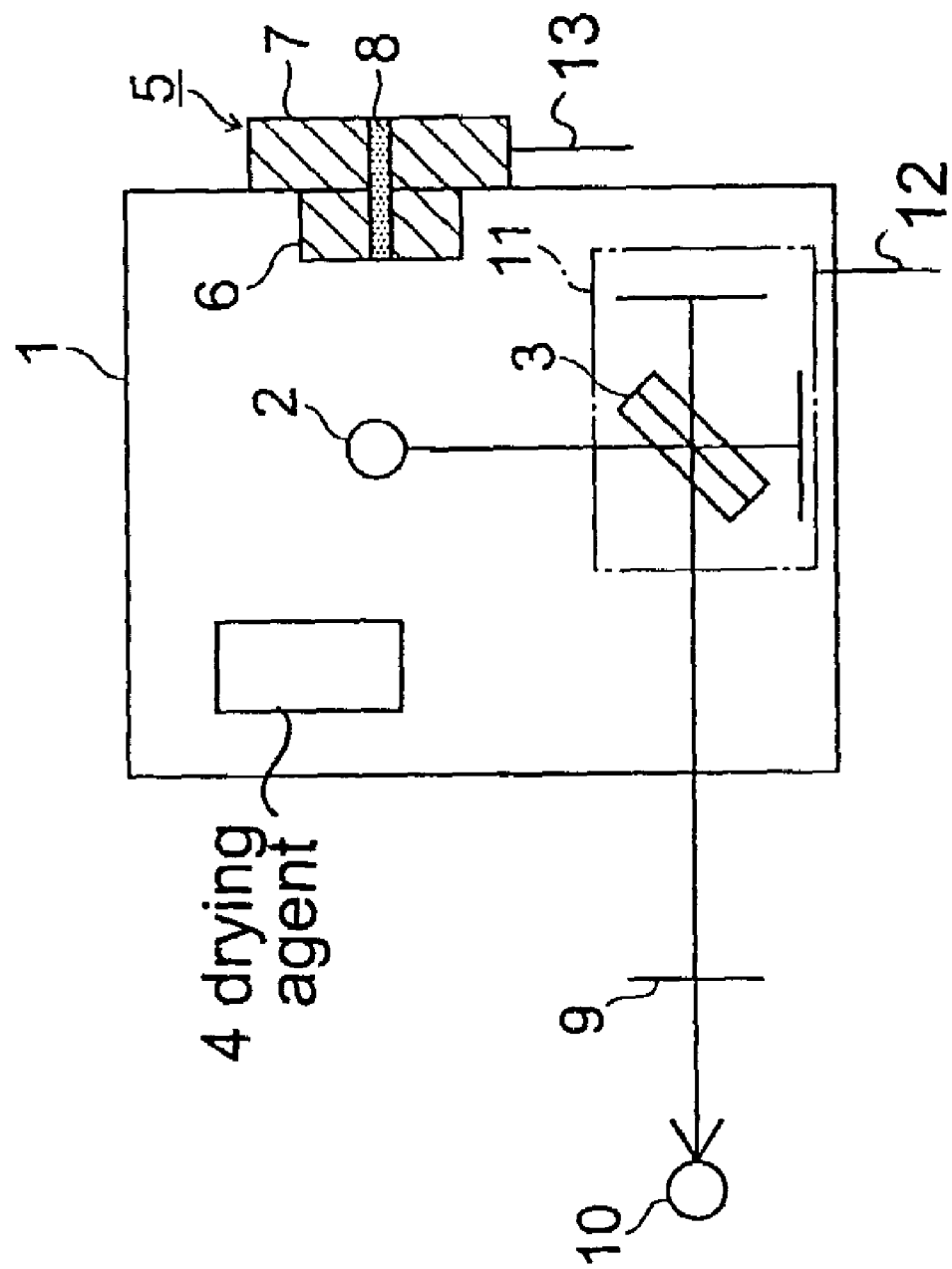
FIG. 1 is a schematic view showing a structure of an interferometer portion of an FTIR according to an embodiment of the present invention.

FIG. 1 is a sectional view schematically showing an interferometer portion of an FTIR according to an embodiment of the present invention. In the drawing, reference numeral 1 represents a sealed chamber for housing an interferometer. The sealed chamber 1 includes an infrared light source 2 and a Michelson interferometer 11 as an example of the interferometer. The interferometer 11 includes a beam splitter 3 formed of an optical material such as KBr with deliquescence property.

A sample 9 is placed outside the sealed chamber 1 in a light path of an infrared ray separated from the interferometer 11 in the sealed chamber 1, and an infrared ray detector 10 is provided for detecting the infrared ray passing through the sample 9.

A drying unit 5 having a Peltier element is provided for maintaining the sealed chamber 1 in a low humidity state. Reference numeral 6 represents a cooling side of the Peltier element, and reference numeral 7 represents a heating side thereof. The cooling side 6 is disposed in the sealed chamber 1, and the heating side 7 is disposed outside of the sealed chamber 1. A moisture absorbent 8 is disposed for transferring the moisture from the cooling side 6 to the heating side 7 of the Peltier element with a capillary phenomenon. The moisture absorbent 8 absorbs the moisture from the cooling side 6 and transfers the moisture outside the sealed chamber 1. The moisture is heated on the heating side 7 of the Peltier element and discharged. Further, a drying agent 4 such as a silica gel is disposed in the sealed chamber 1.

The infrared light source 2 and the Michelson interferometer 11 have a power line 12, and the drying unit 5 has a power line 13 separately. The drying unit 5 can be operated when the interferometer 11 is not used.

In the present embodiment, when the Peltier element of the drying unit 5 is powered on, the moisture in the sealed chamber 1 is condensed on the cooling portion contacting the cooling side in the sealed chamber 1. The condensed moisture is transferred to the heating side 7 at an outside of the sealed chamber 1 through the moisture absorbent 8, and the moisture heated on the heating side 7 is evaporated and discharged outside. With this mechanism, the moisture in the sealed chamber 1 housing the interferometer 11 is reduced, thereby lowering the moisture content of the chamber.

While the drying agent 4 is not necessarily required, in a case that the drying agent 4 is provided as in the present embodiment, it is possible to maintain the dried state in the sealed chamber 1 more securely. For example, in a case where a capacity of the drying unit is low, or the drying unit is stopped due to electricity failure, the dried state in the sealed chamber 1 can still be maintained.

According to the present invention, the FTIR includes the drying unit for discharging the moisture condensed at the cooling portion provided in the chamber housing the optical element made of a material with deliquescence property. Accordingly, it is possible to maintain the chamber at a low humidity sate with the drying unit running continuously. Thus, it is not necessary to provide an ordinary drying agent, or exchange the drying agent. In the case that the drying agent is used at the same time, even when the drying unit has a low capacity, the drying agent does not need to be exchanged frequently.

While the invention has been explained with reference to the specific embodiments of the invention, the explanation is illustrative and the invention is limited only by the appended claims.

What is claimed is:

1. A Fourier transform infrared spectrometer including an optical element made of a material with deliquescence property, comprising:
   a chamber for retaining the optical element, and
   a drying unit attached to the chamber and having a cooling portion provided in the chamber for condensing moisture in the chamber and a heating portion provided outside the chamber for discharging the moisture.

2. A Fourier transforming infrared spectrometer as claimed in claim 1, wherein said drying unit is a Peltier element.

3. A Fourier transforming infrared spectrometer as claimed in claim 2, further comprising a first power supply line for the drying unit and a second power supply line for the Fourier transforming infrared spectrometer so that the drying unit can be operated separately.

4. A Fourier transforming infrared spectrometer as claimed in claim 1, further comprising a drying agent disposed in the chamber.

5. A Fourier transformer infrared spectrometer as claimed in claim 1, wherein said drying unit further includes a passage between the cooling portion and the heating portion for discharging the moisture therethrough.

6. A Fourier transformer infrared spectrometer as claimed in claim 5, wherein said drying unit further includes a moisture absorbent disposed in the passage for collecting the moisture at the cooling portion and transferring the moisture to the heating portion to evaporate the moisture at the heating portion.

* * * * *